United States Patent
Fang et al.

(10) Patent No.: US 10,313,016 B2
(45) Date of Patent: Jun. 4, 2019

(54) DATA TRANSMISSION AND RECEIVING METHODS BASED ON ORTHOGONAL FREQUENCY DIVISION MULTIPLEXING TECHNOLOGY, AND APPARATUS

(71) Applicant: HUAWEI TECHNOLOGIES CO., LTD., Shenzhen, Guangdong (CN)

(72) Inventors: Yuanyuan Fang, Shenzhen (CN); Liangchuan Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/852,561

(22) Filed: Dec. 22, 2017

(65) Prior Publication Data

US 2018/0138984 A1    May 17, 2018

Related U.S. Application Data

(63) Continuation of application No. PCT/CN2015/082343, filed on Jun. 25, 2015.

(51) Int. Cl.
*H04B 10/04* (2006.01)
*H04B 10/516* (2013.01)
(Continued)

(52) U.S. Cl.
CPC ....... *H04B 10/5161* (2013.01); *H04B 10/255* (2013.01); *H04B 10/2543* (2013.01);
(Continued)

(58) Field of Classification Search
CPC .. H04J 14/02; H04J 14/0298; H04B 10/2507; H04B 10/516; H04B 10/548; H04B 10/5561; H04B 10/5161; H04B 10/6163; H04B 10/6164; H04B 10/6165; H04B 10/556; H04B 10/588; H04B 10/58
(Continued)

(56) References Cited

U.S. PATENT DOCUMENTS 8,467,687 B2 * 6/2013 Sasaki ................ H04J 14/02
398/141
2005/0025039 A1   2/2005 Hwang et al.
(Continued)

FOREIGN PATENT DOCUMENTS

CN    1741517 A    3/2006
CN    101278497 A    10/2008
(Continued)

OTHER PUBLICATIONS

International Search report dated Mar. 25, 2016 in corresponding Patent Application No. PCT/CN2015/082343.
(Continued)

*Primary Examiner* — Hanh Phan
(74) *Attorney, Agent, or Firm* — Staas & Halsey LLP

(57) ABSTRACT

Embodiments of the present invention provide data transmission and receiving methods based on an orthogonal frequency division multiplexing technology, and an apparatus. According to the present invention, grouping and differential encoding are performed on multiple subcarriers, and further, carrier location adjustment is performed, so as to effectively improve non-linear tolerance of a multi-subcarrier system.

14 Claims, 10 Drawing Sheets

(51) Int. Cl.
*H04B 10/255* (2013.01)
*H04L 27/20* (2006.01)
*H04L 27/26* (2006.01)
*H04L 5/00* (2006.01)
*H04B 10/2543* (2013.01)
*H04B 10/548* (2013.01)

(52) U.S. Cl.
CPC ......... *H04B 10/548* (2013.01); *H04L 5/0007* (2013.01); *H04L 27/2096* (2013.01); *H04L 27/2602* (2013.01); *H04L 27/2628* (2013.01); *H04L 27/2647* (2013.01)

(58) Field of Classification Search
USPC ......... 398/79, 183, 188, 192, 193, 194, 141, 398/158, 159, 202, 208, 209, 76, 135, 398/136, 138, 81
See application file for complete search history.

(56) References Cited

U.S. PATENT DOCUMENTS

2009/0010149 A1  1/2009  Lee et al.
2010/0247099 A1*  9/2010  Lowery .............. H04B 10/2543
                                                                    398/79
2012/0263471 A1  10/2012  Buchali et al.
2013/0195459 A1  8/2013  Shieh

FOREIGN PATENT DOCUMENTS

| | | |
|---|---|---|
| CN | 101636941 A | 1/2010 |
| CN | 103684696 A | 3/2014 |
| CN | 104580058 A | 4/2015 |
| EP | 2066044 | 6/2009 |
| JP | 2009-16924 | 1/2009 |

OTHER PUBLICATIONS

Extended European Search Report, dated May 23, 2018, in European Application No. 15895945.2 (8 pp.).

S. T. Le et al: "Phase-conjugated Pilots for Fibre Nonlinearity Compensation in CO-OFDM Transmission", European Conference on Optical Communication 2014, Cannes—France, We.2.3.1, 3 pages.

Written Opinion of the International Search Report dated Mar. 25, 2016 in corresponding Patent Application No. PCT/CN2015/082343.

* cited by examiner

DATA TRANSMISSION AND RECEIVING METHODS BASED ON ORTHOGONAL FREQUENCY DIVISION MULTIPLEXING TECHNOLOGY, AND APPARATUS

CROSS-REFERENCE TO RELATED APPLICATIONS

This application is a continuation of International Application No. PCT/CN2015/082343, filed on Jun. 25, 2015, which is hereby incorporated by reference in its entirety.

TECHNICAL FIELD

Embodiments of the present invention relate to communications technologies, and in particular, to data transmission and receiving methods based on an orthogonal frequency division multiplexing technology, and an apparatus.

BACKGROUND

In recent years, a requirement of a backbone network for a transmission service capacity increases sharply. A 100 Gbit/s system has been put into commercial deployment. 400 Gbit/s and 1 Tbit/s have become a next point of interest of operators. How to improve a system capacity, that is, improve spectral efficiency and implement a flexible variable-bandwidth network architecture, while maintaining a high rate gradually becomes a focus of the industry. Orthogonal frequency division multiplexing (OFDM) has been successfully applied on a broadband wired network and a wireless network. Orthogonal frequency division multiplexing is a special form of a multi-carrier modulation technology, and adds high-speed data streams onto multiple low-speed subcarriers. An OFDM signal is generated and demodulated in a digital domain. Spectrums of OFDM subcarriers are orthogonal and partially overlapped. Therefore, high spectral efficiency can be achieved. Modulation and demodulation of the OFDM signal are implemented based on IFFT and FFT respectively. Orthogonal frequency division multiplexing is a multi-carrier transmission solution that has lowest implementation complexity and that is most widely applied. Because of an advantage of an FFT algorithm, OFDM can easily implement modulation and be applied to a high-speed system. In addition, OFDM may further implement a "soft change" of a modulation format, that is, implement a variable modulation format without changing a hardware architecture, thereby easily implementing flexible variable bandwidth control. The OFDM signal has the foregoing advantages. As a key technology of a high-speed flexible network, OFDM gradually becomes a hot topic of research in the industry.

In a wavelength division multiplexing (Wavelength Division Multiplexing, WDM for short) system based on any modulation format, one optical fiber includes tens of or even hundreds of optical channels. As an optical fiber amplifier is used, multi-wavelength optical signals with relatively high power are coupled into one optical fiber and aggregate on a very small cross section. As a result, the optical fiber begins to present a non-linear feature. This becomes a key factor limiting performance of a transmission system. Therefore, research on how to improve non-linear tolerance of the OFDM signal is of great significance.

SUMMARY

Embodiments of the present invention provide data transmission and receiving methods based on an orthogonal frequency division multiplexing technology, and an apparatus, so as to improve non-linear tolerance of an OFDM signal.

According to a first aspect, an embodiment of the present invention provides a data transmission method based on an orthogonal frequency division multiplexing technology, including:

processing input data to obtain a modulated signal, where the modulated signal includes continuous subcarriers in multiple frequency domains;

grouping the continuous subcarriers in the multiple frequency domains according to grouping information, to obtain multiple carrier groups, where each carrier group includes at least one of the subcarriers, the grouping information is related to a correspondence between a non-linear noise and a frequency, and a difference between non-linear noises corresponding to subcarriers in each carrier group is in a threshold range;

separately performing differential phase encoding on the subcarriers in each carrier group, to obtain encoded subcarriers of the subcarriers;

adjusting, according to a sequence, the encoded subcarriers of the continuous subcarriers to frequency locations that are symmetric on a positive frequency side and a negative frequency side, to obtain a to-be-transmitted signal; and performing frequency-to-time conversion processing on the to-be-transmitted signal, and sending a signal to a receiver by using a non-linear optical channel.

According to a second aspect, an embodiment of the present invention provides a data receiving method based on an orthogonal frequency division multiplexing technology, including:

performing basic digital signal processing on a received signal to obtain a first to-be-processed signal, where the first to-be-processed signal includes multiple encoded subcarriers;

sequentially adjusting, starting from the center frequency, locations of two encoded subcarriers whose locations are symmetric on a positive frequency side and a negative frequency side to be continuously distributed, to obtain a second to-be-processed signal;

separately obtaining, according to grouping information of the encoded subcarriers in the second to-be-processed signal, a phase noise corresponding to the grouping information, and separately compensating the phase noise for the encoded subcarriers in a carrier group corresponding to the grouping information, to obtain a third to-be-processed signal; and performing differential decoding processing on the third to-be-processed signal to obtain a processed signal.

According to a third aspect, an embodiment of the present invention provides a transmitter, including:

a basic digital signal processing module, configured to process input data to obtain a modulated signal, where the modulated signal includes continuous subcarriers in multiple frequency domains;

a grouping and encoding module, configured to: group the continuous subcarriers in the multiple frequency domains according to grouping information, to obtain multiple carrier groups, where each carrier group includes at least one of the subcarriers, the grouping information is related to a correspondence between a non-linear noise and a frequency, and a difference between non-linear noises corresponding to subcarriers in each carrier group is in a threshold range; and separately perform differential phase encoding on the subcarriers in each carrier group, to obtain encoded subcarriers of the subcarriers;

a carrier location adjustment module, configured to adjust, according to a sequence, the encoded subcarriers of the adjacent subcarriers to frequency locations that are symmetric on a positive frequency side and a negative frequency side, to obtain a to-be-transmitted signal; and a transmission module, configured to: perform frequency-to-time conversion processing on the to-be-transmitted signal, and send a signal to a receiver by using a non-linear optical channel.

According to a fourth aspect, an embodiment of the present invention provides a receiver, including:

a basic digital signal processing module, configured to perform basic digital signal processing on a received signal to obtain a first to-be-processed signal, where the first to-be-processed signal includes multiple encoded subcarriers;

a carrier location adjustment module, configured to sequentially adjust, starting from the center frequency, locations of two encoded subcarriers whose locations are symmetric on a positive frequency side and a negative frequency side to be continuously distributed, to obtain a second to-be-processed signal;

a phase noise restoration module, configured to: separately obtain, according to grouping information of the encoded subcarriers in the second to-be-processed signal, a phase noise corresponding to the grouping information, and separately compensate the phase noise for the encoded subcarriers in a carrier group corresponding to the grouping information, to obtain a third to-be-processed signal; and a differential decoding module, configured to perform differential decoding processing on the third to-be-processed signal to obtain a processed signal.

According to a fifth aspect, an embodiment of the present invention provides a transmission device, including:

a receiver, configured to receive input data;

a processor, configured to: process the input data to obtain a modulated signal, where the modulated signal includes continuous subcarriers in multiple frequency domains; group the continuous subcarriers in the multiple frequency domains according to grouping information, to obtain multiple carrier groups, where each carrier group includes at least one of the subcarriers, the grouping information is related to a correspondence between a non-linear noise and a frequency, and a difference between non-linear noises corresponding to subcarriers in each carrier group is in a threshold range; separately perform differential phase encoding on the subcarriers in each carrier group, to obtain encoded subcarriers of the subcarriers; adjust, according to a sequence, the encoded subcarriers of the continuous subcarriers to frequency locations that are symmetric on a positive frequency side and a negative frequency side, to obtain a to-be-transmitted signal; and perform frequency-to-time conversion processing on the to-be-transmitted signal, to obtain a time-domain signal; and a transmitter, configured to send the time-domain signal to a receiving device by using a non-linear optical channel.

According to a sixth aspect, an embodiment of the present invention provides a receiving device, where the receiving device includes:

a receiver, configured to receive a signal sent by a transmission device; and a processor, configured to: perform basic digital signal processing on the signal to obtain a first to-be-processed signal, where the first to-be-processed signal includes multiple encoded subcarriers; sequentially adjust, starting from the center frequency, locations of two encoded subcarriers whose locations are symmetric on a positive frequency side and a negative frequency side to be continuously distributed, to obtain a second to-be-processed signal; separately obtain, according to grouping information of the encoded subcarriers in the second to-be-processed signal, a phase noise corresponding to the grouping information, and separately compensate the phase noise for the encoded subcarriers in a carrier group corresponding to the grouping information, to obtain a third to-be-processed signal; and perform differential decoding processing on the third to-be-processed signal to obtain a processed signal.

According to the data transmission and receiving methods based on the orthogonal frequency division multiplexing technology, and the apparatus in the embodiments of the present invention, the continuous subcarriers in the multiple frequency domains are grouped according to relevance of non-linear noises, to obtain at least one carrier group; differential phase encoding is performed on the subcarriers in each carrier group, to obtain the encoded subcarriers of the subcarriers; the encoded subcarriers of the adjacent subcarriers are sequentially adjusted, according to the sequence, to the frequency locations that are symmetric on the positive frequency side and the negative frequency side, to obtain the to-be-transmitted signal; and frequency-to-time processing is performed on the to-be-transmitted signal, and the signal is sent to the receiver by using the non-linear optical channel. Non-linear noises of the subcarriers in each carrier group have relatively high relevance, differential phase encoding is performed, and location adjustment is performed on the encoded subcarriers of the subcarriers. Therefore, after FFT transform and the location adjustment, the continuous encoded subcarriers at a receiver end have relatively high non-linear relevance. Further, the receive end may effectively compensate SPM, XPM, and FWM non-linear effects with a low overhead, thereby improving non-linear tolerance of a multi-subcarrier system.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
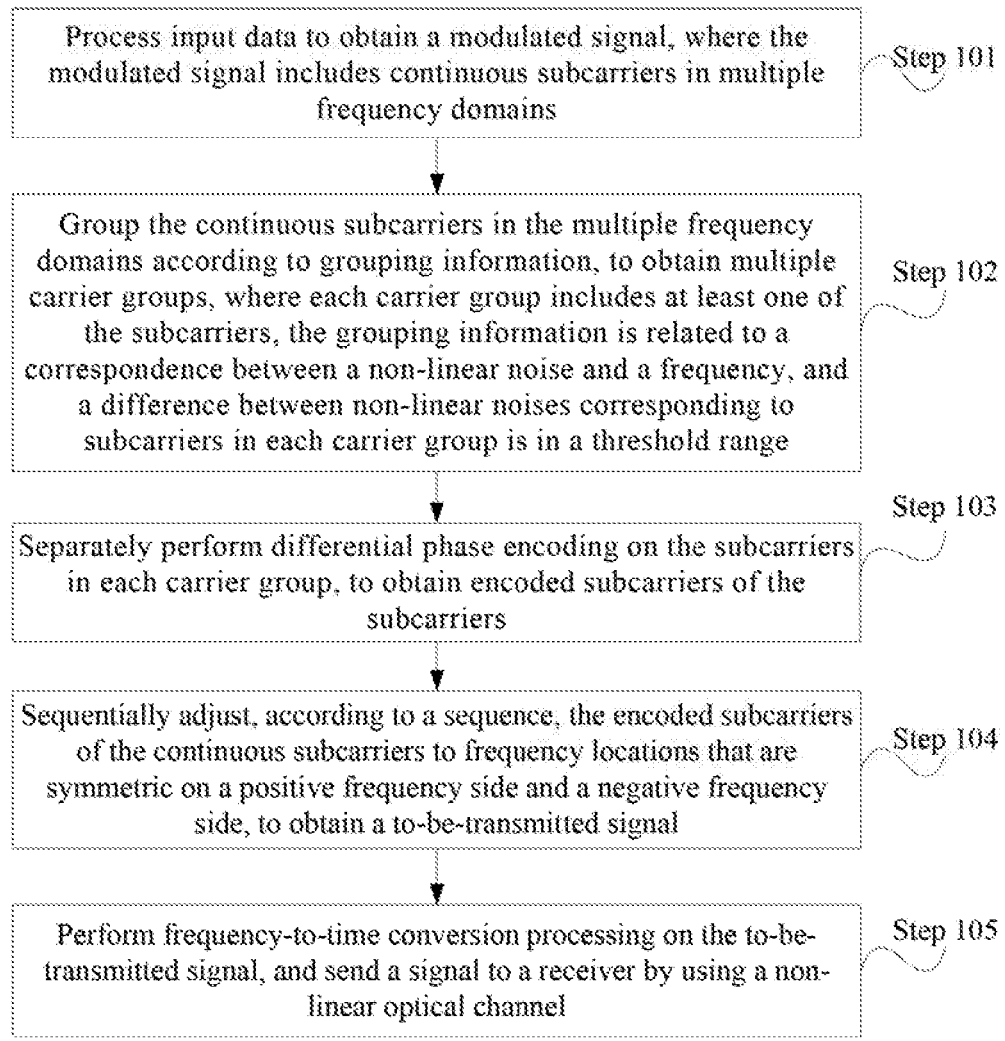
FIG. 1 is a flowchart of a first embodiment of a data transmission method based on an orthogonal frequency division multiplexing technology according to the present invention.

FIG. 1 is a flowchart of a first embodiment of a data transmission method based on an orthogonal frequency division multiplexing technology according to the present invention. An execution body in this embodiment is a transmitter. As shown in FIG. 1, the method in this embodiment may include the following steps.

Step 101. Process input data to obtain a modulated signal, where the modulated signal includes continuous subcarriers in multiple frequency domains.

Step 102. Group the continuous subcarriers in the multiple frequency domains according to grouping information, to obtain multiple carrier groups, where each carrier group includes at least one of the subcarriers, the grouping information is related to a correspondence between a non-linear noise and a frequency, and a difference between non-linear noises corresponding to subcarriers in each carrier group is in a threshold range.

Figure 2:
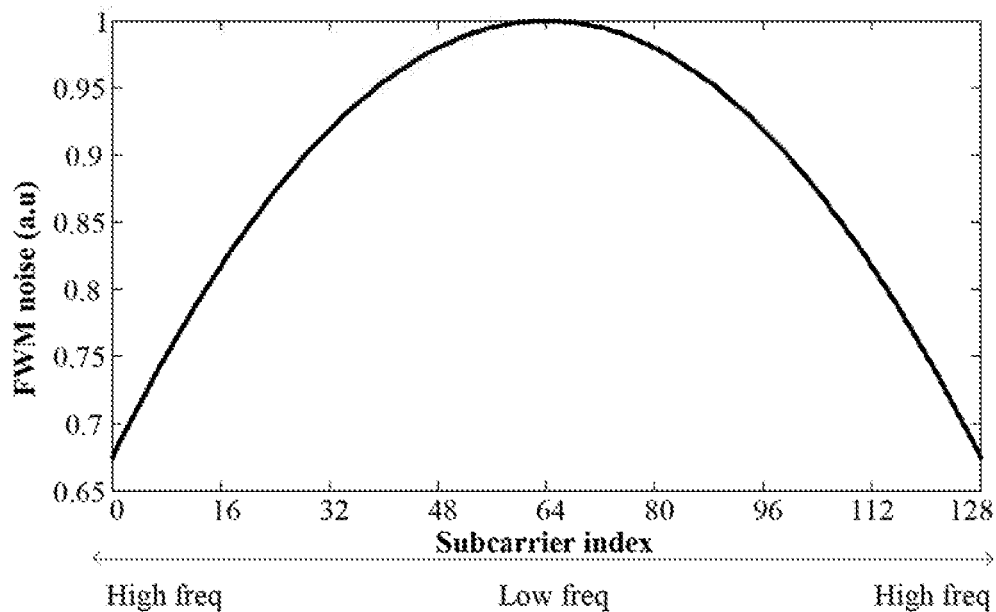
FIG. 2 is a schematic diagram of a correspondence between a non-linear noise and a frequency.

Specifically, FIG. 2 is a schematic diagram of the correspondence between a non-linear noise and a frequency. Non-linearity of an OFDM system mainly includes self phase modulation (Self Phase Modulation, SPM for short), cross phase modulation (Cross Phase Modulation, XPM for short), and four wave mixing (Four Wave Mixing, FWM for short). Both SPM and XPM may be considered as particular examples of FWM. Based on this assumption, it can be learned, according to a formula, that the correspondence between a non-linear noise and a frequency of the system is shown in FIG. 2. It can be learned from FIG. 2 that a non-linear noise at a low frequency is relatively large and non-linear noises are distributed approximately symmetrically at a positive frequency and a negative frequency. The continuous subcarriers in the multiple frequency domains are grouped according to the relationship between a non-linear noise and a frequency that is shown in FIG. 2. A specific grouping rule is to ensure that relevance of the subcarriers in each carrier group after grouping is high. Lengths of the carrier groups may be set to a same length, or may be set to different lengths according to relevance and values of the non-linear noises. Specifically, groups may be distributed relatively densely in a place that is at a low frequency and that is of relatively strong non-linearity, that is, a corresponding length of a carrier group is short; and there may be fewer groups in a place that is at a high frequency and that is of relatively weak non-linearity, that is, the groups are distributed sparsely in the place that is at a high frequency, that is, a corresponding length of a carrier group is relatively long.

It should be noted that, in a conventional orthogonal frequency division multiplexing (Orthogonal Frequency Division Multiplexing, OFDM for short) signal structure, it is assumed that a quantity of FFT points of an OFDM symbol is N and a quantity of valid subcarriers is n (that is, a quantity of subcarriers that bear signals), where known pilot signals are inserted into some subcarriers for phase restoration, remaining n–$n_p$ subcarriers are filled with data symbols, and N–n subcarriers are filled with 0s, ensuring a sampling rate of at least 1.2 times to enable a receive end to restore, without penalty, a transmit signal; and it is assumed that a pilot symbol is $X_p$, a data symbol is $X_d$, and a pilot insertion interval is L=n/$n_p$, where $n_p$ is a quantity of pilots; and then a signal before undergoing IFFT mapping may be expressed as follows:

$$C(k) = C(mL+l) = \begin{cases} X_p, l = 0 \\ X_d, l = 1, \ldots, L-1 \end{cases} \quad (1)$$

$$m = 0, 1, \ldots, n_p - 1$$

However, in this embodiment, the continuous subcarriers in the multiple frequency domains are grouped according to the grouping information related to the relevance of the non-linear noises, to obtain at least one carrier group. In addition, a pilot signal in each carrier group is removed. Therefore, in this embodiment, a signal obtained after grouping may be expressed as follows:

$$C(k)=C(mL+l)=X_d, l=0, \ldots, L-1 \ m=0,1, \ldots, M-1 \quad (2),$$ where

L is a length of a carrier group, and M is a quantity of carrier groups.

Step 103. Separately perform differential phase encoding on the subcarriers in each carrier group, to obtain encoded subcarriers of the subcarriers.

Step 104. Adjust, according to a sequence, the encoded subcarriers of the continuous subcarriers to frequency locations that are symmetric on a positive frequency side and a negative frequency side, to obtain a to-be-transmitted signal.

The to-be-transmitted signal includes encoded subcarriers in all carrier groups. Specifically, the encoded subcarriers of the continuous subcarriers are obtained after the encoding step in step 103. In step 104, starting from the first encoded subcarrier, the continuous encoded subcarriers are adjusted, according to the sequence, to the frequency locations that are symmetric on the positive frequency side and the negative frequency side. Specifically, provided that a zero frequency is used as a center, a frequency on a left side of the zero frequency is a negative frequency, the first frequency is corresponding to a high frequency, a frequency on a right side of the zero frequency is a positive frequency, and the last frequency is corresponding to a high frequency. Herein, the first encoded subcarrier and the second encoded subcarrier are placed at the last positive frequency and the first negative frequency respectively, the third encoded subcarrier and the fourth encoded subcarrier are placed at the last positive frequency but one and the second negative frequency respectively. That is, according to an arrangement sequence of the encoded subcarriers, encoded subcarriers in odd locations are adjusted to the positive frequency side and are sequentially arranged in a reverse order, and encoded subcarriers in even locations are adjusted to the negative frequency side and are sequentially arranged in order. Certainly, optionally, encoded subcarriers in odd locations may be adjusted to the negative frequency side, and encoded subcarriers in even locations may be adjusted to the positive frequency side. Locations of other encoded subcarriers are adjusted according to the same manner. Details are not described herein.

Figure 3:
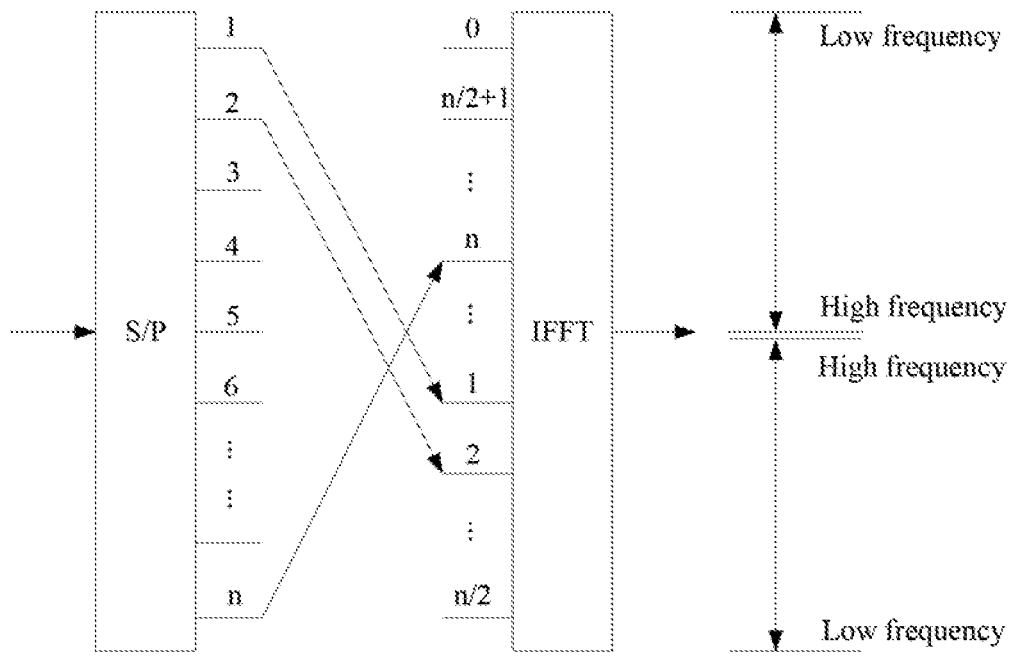
FIG. 3 is a schematic diagram of a subcarrier mapping manner of an OFDM signal in the prior art.

To understand the foregoing location adjustment process of the encoded subcarriers more clearly, the location adjustment process in the present invention is compared with a subcarrier mapping manner in the prior art for description. FIG. 3 is a schematic diagram of a subcarrier mapping manner of an OFDM signal in the prior art. Specifically, according to an operation rule of Inverse Fast Fourier Transform (Inverse Fast Fourier Transform, IFFT for short), when n subcarriers are mapped onto N IFFT frequencies, the first frequency of the N IFFT frequencies is usually set to 0 and is a direct current component. As shown in FIG. 3, the 1st to the (n/2)th subcarriers are mapped onto the last n/2 IFFT frequencies, the (n/2+1)th to the nth subcarrier are mapped onto the first n/2 IFFT frequencies, and a remaining frequency is filled with a signal 0. Specifically, as shown in FIG. 3, after mapping, a high frequency is at a center, and low frequencies are at two ends. It is assumed that a first half axis is a negative frequency and a second half axis is a positive frequency. Before mapping, from top to bottom, the 1st subcarrier is mapped onto the first frequency on the positive frequency side, and the 2nd subcarrier is mapped onto the second frequency on the positive frequency side.

Figure 4:
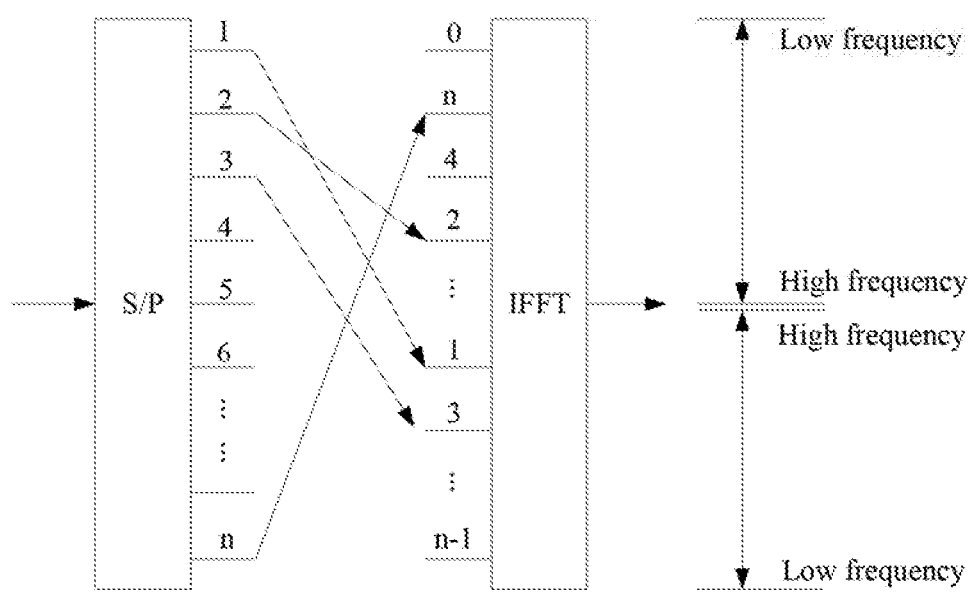
FIG. 4 is a schematic diagram of a subcarrier mapping manner of an OFDM signal according to the present invention.

FIG. 4 is a schematic diagram of a subcarrier mapping manner of an OFDM signal according to the present invention. It can be learned from FIG. 4 that the location adjustment process (the subcarrier mapping manner) in the present invention is sequentially mapping, from top to bottom, subcarriers in continuous locations onto frequency locations that are symmetric on the positive frequency side and the negative frequency side. Specifically, the first subcarrier is mapped onto the first frequency on a positive half axis, and the second subcarrier is mapped onto a frequency that is on a negative half axis and that is symmetric to a mapping location of the first subcarrier. It can be learned that the location adjustment manner of the encoded subcarriers in the present invention is different from the subcarrier mapping manner in the prior art. After the locations of the encoded subcarriers are adjusted by using the location adjustment manner of the encoded subcarriers in the present invention, IFFT transform is performed. According to the correspondence between a non-linear noise and a frequency in FIG. 2, it can be learned that, according to the location adjustment manner of the encoded subcarriers in the present invention, after the receive end performs Fast Fourier Transform (Fast Fourier Transformation, FFT for short), encoded subcarriers in a carrier group may encounter an approximately same non-linear noise, so as to better compensate the non-linear noise.

Step 105. Perform frequency-to-time conversion processing on the to-be-transmitted signal, and send a signal to a receiver by using a non-linear optical channel.

The frequency-to-time conversion processing may be specifically IFFT, that is, converting a frequency-domain signal into a time-domain signal for transmission.

Further, the separately performing differential phase encoding on the subcarriers in each carrier group, to obtain encoded subcarriers of the subcarriers in step 103 may be specifically: using the first subcarrier in each carrier group as an encoded subcarrier of the first subcarrier in the carrier group; using a conjugate of a previous subcarrier of the last subcarrier in each carrier group as an encoded subcarrier of the last subcarrier in the carrier group; for a subcarrier that is in a middle location and that is neither the first subcarrier nor the last subcarrier in each carrier group, subtracting a phase of a previous subcarrier of the subcarrier in the middle location from a phase of the subcarrier in the middle location, to obtain a phase of an encoded subcarrier of the subcarrier in the middle location, using an amplitude of the subcarrier in the middle location as an amplitude of the encoded subcarrier of the subcarrier in the middle location, and obtaining an encoded subcarrier of each subcarrier in a middle location in the carrier group; and obtaining encoded subcarriers of all subcarriers in each carrier group, where the encoded subcarriers of all the subcarriers in each carrier group include: the encoded subcarrier of the first subcarrier in the carrier group, the encoded subcarrier of each subcarrier in the middle location in the carrier group, and the encoded subcarrier of the last subcarrier in the carrier group.

Specifically, the signal obtained after the grouping is expressed by using the formula (2), and signal data obtained after the foregoing differential encoding is as follows:

$$D(k) = D(mL+l) = \begin{cases} C(mL+l), & l=0 \\ |C(mL+l)| \times \exp(j \times (\text{angle}(C(mL+l)) - \text{angle}(C(mL+l-1)))), & l=1, \ldots, L-2, \\ \text{conj}(C(mL+l-1)), & l=L-1 \end{cases}$$

where angle(C(mL+l)) is a phase of a subcarrier C(mL+l), conj( ) is a conjugate function, and D(k) is an encoded subcarrier. Data of the first subcarrier in each carrier group may be a data signal, or may be a known signal (a training sequence). This does not constitute a limitation herein. When the data of the first subcarrier is a known signal, phase estimation accuracy can be improved, but correspondingly, overheads increase. Flexible setting may be performed according to a requirement herein.

Optionally, the performing frequency-to-time conversion processing on the to-be-transmitted signal, and sending a signal to a receiver by using a non-linear optical channel in step 105 may be specifically: performing Inverse Fast Fourier Transform IFFT processing on the to-be-transmitted signal to obtain a time-domain signal, performing digital-to-analog conversion processing on the time-domain signal to obtain an analog signal, modulating the analog signal to an optical carrier, and sending the modulated signal to the receiver by using the non-linear optical channel.

Further, the processing input data to obtain a modulated signal, where the modulated signal includes continuous subcarriers in multiple frequency domains may be specifically: performing serial-to-parallel conversion processing on the input data, to obtain parallel input data; and performing constellation mapping processing on the parallel input data to obtain multiple amplitudes and phases corresponding to the amplitudes, and separately modulating the amplitudes and the phases to the continuous subcarriers in the frequency domains to generate the modulated signal.

In this embodiment, the continuous subcarriers in the multiple frequency domains are grouped according to relevance of non-linear noises, to obtain at least one carrier group; differential phase encoding is performed on the subcarriers in each carrier group, to obtain the encoded subcarriers of the subcarriers; the encoded subcarriers of the adjacent subcarriers are sequentially adjusted, according to the sequence, to the frequency locations that are symmetric on the positive frequency side and the negative frequency side, to obtain the to-be-transmitted signal; and frequency-to-time processing is performed on the to-be-transmitted signal, and the signal is sent to the receiver by using the non-linear optical channel. Non-linear noises of the subcarriers in each carrier group have relatively high relevance, differential phase encoding is performed, and location adjustment is performed on the encoded subcarriers of the subcarriers. Therefore, after FFT transform and the location adjustment, the continuous encoded subcarriers at the receive end have relatively high non-linear relevance. Further, the receive end may effectively compensate SPM, XPM, and FWM non-linear effects with a low overhead, thereby improving non-linear tolerance of a multi-subcarrier system.

Figure 5:
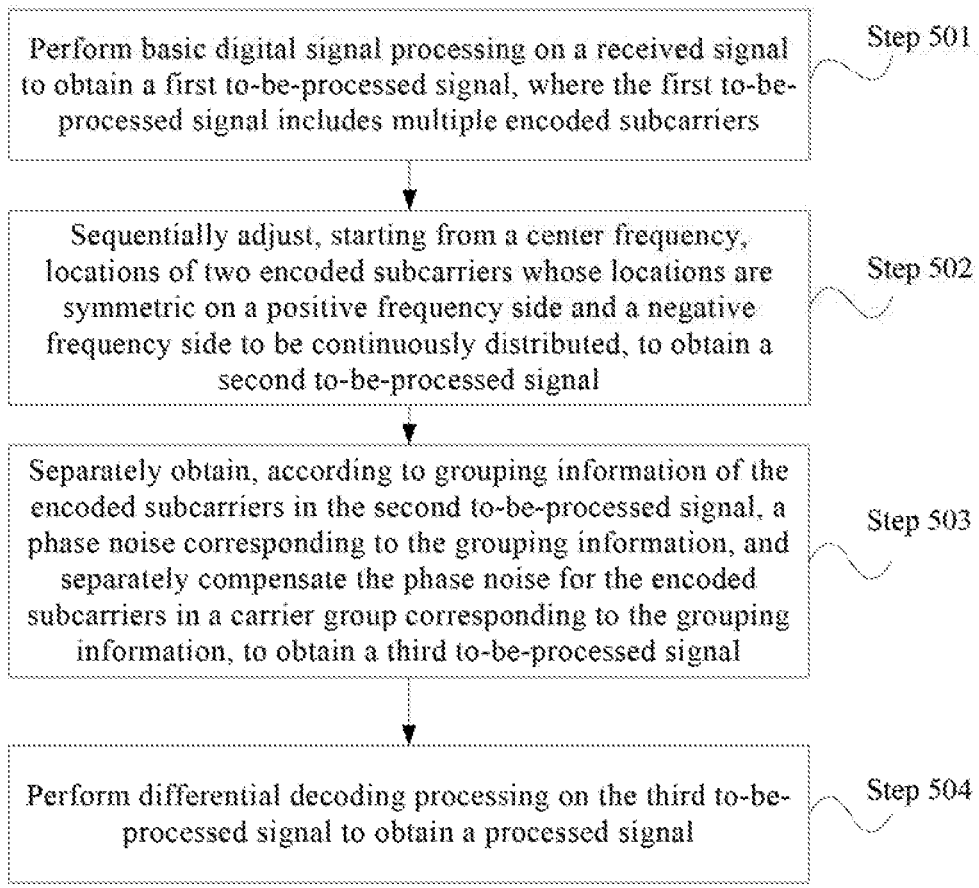
FIG. 5 is a flowchart of a first embodiment of a data receiving method based on an orthogonal frequency division multiplexing technology according to the present invention.

FIG. 5 is a flowchart of a first embodiment of a data receiving method based on an orthogonal frequency division multiplexing technology according to the present invention. An execution body in this embodiment is a receiver. As shown in FIG. 5, the method in this embodiment may include the following steps.

Step 501. Perform basic digital signal processing on a received signal to obtain a first to-be-processed signal, where the first to-be-processed signal includes multiple encoded subcarriers.

The receiver in this embodiment receives the signal that is generated after the processing in FIG. 1. The receiver first receives the signal that is sent by a transmitter and transmitted through a non-linear optical channel, and then performs basic digital signal processing to obtain the first to-be-processed signal. The basic digital signal processing includes analog data conversion processing, synchronization processing, FFT time-to-frequency conversion processing, and the like. The first to-be-processed signal includes multiple encoded subcarriers that are obtained after differential phase encoding.

Step 502. Sequentially adjust, starting from a center frequency, locations of two encoded subcarriers whose locations are symmetric on a positive frequency side and a negative frequency side to be continuously distributed, to obtain a second to-be-processed signal.

Specifically, the location adjustment process in step 502 is a reverse process of location adjustment in FIG. 4. That is, starting from the center frequency, the two encoded subcarriers whose locations are symmetric on the positive frequency side and the negative frequency side are adjusted to be adjacently distributed. Specifically, an encoded subcarrier on the positive frequency side may be placed before an encoded subcarrier on the negative frequency side; or an encoded subcarrier on the negative frequency side may be placed after an encoded subcarrier on the positive frequency side, provided that a specific adjustment manner is corresponding to a specific manner used on a transmitter side. That is, on the transmitter side, if the first encoded subcarrier in the two adjacent encoded subcarriers is placed at a frequency on the positive frequency side and the second encoded subcarrier is placed at a symmetric frequency on the negative frequency side, on a receiver side, the encoded subcarrier on the positive frequency side needs to be placed before the encoded subcarrier on the negative frequency side. To sum up, the locations of the encoded subcarriers are adjusted to an arrangement sequence that is before the transmitter performs location adjustment.

Because the transmitter side performs location adjustment on the encoded subcarriers, the original continuously distributed encoded subcarriers are distributed in symmetric locations on the positive frequency side and the negative frequency side. It can be learned from the foregoing analysis of FIG. 2 that, after the FFT transform is performed at a receiver end, the encoded subcarriers in the symmetric locations encounter an approximately same non-linear noise. Therefore, after the location adjustment in step 502 is performed at the receiver end, the encoded subcarriers distributed symmetrically on the positive frequency side and the negative frequency side are restored to be continuously distributed. Therefore, the continuous encoded subcarriers have stronger non-linear relevance.

Step 503. Separately obtain, according to grouping information of the encoded subcarriers in the second to-be-processed signal, a phase noise corresponding to the grouping information, and separately compensate the phase noise for the encoded subcarriers in a carrier group corresponding to the grouping information, to obtain a third to-be-processed signal.

The grouping information of the encoded subcarriers is the same as the grouping information in step 102.

Specifically, after the foregoing step, the continuous encoded subcarriers in each carrier group have stronger non-linear relevance. Therefore, by performing phase noise compensation in a unit of a carrier group in step 503, a better compensation effect can be obtained with a relatively low overhead, so as to improve non-linear tolerance of a system.

Step 504. Perform differential decoding processing on the third to-be-processed signal to obtain a processed signal.

Further, the separately obtaining, according to grouping information of the encoded subcarriers in the second to-be-processed signal, a phase noise corresponding to the grouping information in step 503 may be specifically: obtaining, according to the grouping information of the encoded subcarriers in the second to-be-processed signal, the carrier group corresponding to the grouping information; and separately adding up phases of the encoded subcarriers in the carrier group corresponding to the grouping information, to obtain the phase noise corresponding to the grouping information.

Specifically, the signal obtained after the differential encoding is expressed by using a formula (3), and after the receiver end receives the signal, a signal obtained by the receiver end by performing FFT transform may be expressed as follows:

$$R(k) = D'(k) \times \exp(j \times (\varphi_{NL} + \varphi_L + \varphi_{ASE}))$$

$$= D'(mL + l) \times \exp(j \times (\varphi_{NL} + \varphi_L + \varphi_{ASE}))$$

-continued $$= \begin{cases} |C'(\mathrm{mL}+l)| \times \exp(j \times (\varphi_{NL\_l} + \varphi_{L\_l} + \varphi_{ASE} + \varphi_{mL+1})), l = 0 \\ |C'(\mathrm{mL}+l)| \times \exp(j \times (\varphi_{NL\_l} + \varphi_{L\_l} + \varphi_{ASE} + \varphi_{mL+1} - \varphi_{mL+l-1})), l = 1, \ldots, L-2, \\ |C'(\mathrm{mL}+l-1)| \times \exp(j \times (\varphi_{NL\_l} + \varphi_{L\_l} + \varphi_{ASE} + \varphi_{mL+l-1})), l = L-1 \end{cases}$$

where $\varphi_{mL+l}$ is a phase of an adjusted symbol, $\varphi_{NL}$ is a non-linear noise of the system, $\varphi_L$ is a phase noise caused by a line width, and $\varphi_{ASE}$ is a white noise of the system.

Non-linear relevance in a carrier group is very high, and non-linear noises are approximately equal. The white noise of the system is a random noise. Noise reduction may be performed by using a sliding window. Phases of encoded subcarriers in a carrier group may be directly added up, to obtain the non-linear noise and the phase noise caused by the line width, where specifically:

$$\varphi_{NL} + \varphi_L = \frac{\sum_{i=0}^{L-1}(\varphi_{NL\_l} + \varphi_{L\_l} + \varphi_{mL+l} + \varphi_{ASE})}{L}$$

A phase noise of a signal obtained after equalization by the receiver is obtained according to the foregoing manner, and is compensated.

Further, the performing differential decoding processing on the third to-be-processed signal to obtain a processed signal in step 504 may be specifically: separately using, as the first decoded subcarrier of the carrier group, the first encoded subcarrier that is in the carrier group corresponding to the grouping information and that is in the third to-be-processed signal; separately using, as the last decoded subcarrier of the carrier group, a conjugate of a previous encoded subcarrier of the last encoded subcarrier that is in the carrier group corresponding to the grouping information and that is in the third to-be-processed signal; and for an encoded subcarrier that is in a middle location in the carrier group corresponding to the grouping information, that is neither the first encoded subcarrier nor the last encoded subcarrier in the carrier group corresponding to the grouping information, and that is in the third to-be-processed signal, adding up a phase of a previous encoded subcarrier of the encoded subcarrier in the middle location and a phase of the encoded subcarrier in the middle location to obtain a phase of a decoded subcarrier in the middle location, using an amplitude of the encoded subcarrier in the middle location as an amplitude of the decoded subcarrier in the middle location, and obtaining the decoded subcarrier in the middle location in the carrier group, where the processed signal includes: the first subcarrier, each subcarrier in a middle location, and the last subcarrier that are obtained after decoding and that are in the carrier group corresponding to the grouping information.

Specifically, the differential decoding is a reverse process of the differential encoding in the embodiment shown in FIG. 1. After performing differential decoding, the receiver may further calculate a bit error rate.

In this embodiment, the signal sent by the transmitter is received, to obtain the first to-be-processed signal. The first to-be-processed signal includes the multiple encoded subcarriers. Starting from the center frequency, the locations of the two encoded subcarriers in the two symmetric locations are sequentially adjusted to be continuously distributed. The phase noise corresponding to the carrier group is obtained, and the phase noise compensation is performed in the unit of a carrier group. Therefore, the continuous encoded subcarriers that are obtained after the FFT transform and the location adjustment may have the relatively strong non-linear relevance. Further, the receiver may effectively compensate SPM, XPM, and FWM non-linear effects with a low overhead, thereby improving non-linear tolerance of a multi-subcarrier system.

Figure 6:
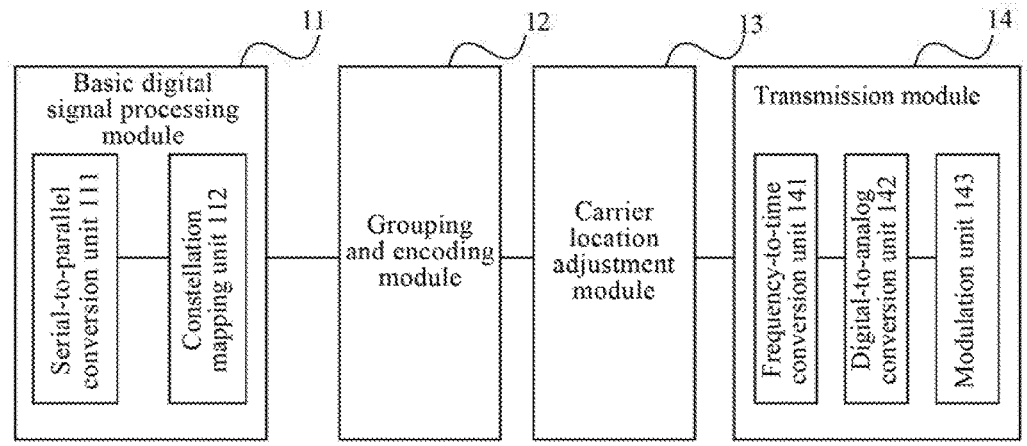
FIG. 6 is a schematic structural diagram of a first embodiment of a transmitter according to the present invention.

FIG. 6 is a schematic structural diagram of a first embodiment of a transmitter according to the present invention. As shown in FIG. 6, the apparatus in this embodiment may include a basic digital signal processing module 11, a grouping and encoding module 12, a carrier location adjustment module 13, and a transmission module 14. The basic digital signal processing module 11 is configured to process input data to obtain a modulated signal, where the modulated signal includes continuous subcarriers in multiple frequency domains. The grouping and encoding module 12 is configured to: group the continuous subcarriers in the multiple frequency domains according to grouping information, to obtain multiple carrier groups, where each carrier group includes at least one of the subcarriers, the grouping information is related to a correspondence between a non-linear noise and a frequency, and a difference between non-linear noises corresponding to subcarriers in each carrier group is in a threshold range; and separately perform differential phase encoding on the subcarriers in each carrier group, to obtain encoded subcarriers of the subcarriers. The carrier location adjustment module 13 is configured to adjust, according to a sequence, the encoded subcarriers of the adjacent subcarriers to frequency locations that are symmetric on a positive frequency side and a negative frequency side, to obtain a to-be-transmitted signal. The transmission module 14 is configured to: perform frequency-to-time conversion processing on the to-be-transmitted signal, and send a signal to a receiver by using a non-linear optical channel.

Further, that the grouping and encoding module 12 is configured to separately perform differential phase encoding on the subcarriers in each carrier group, to obtain encoded subcarriers of the subcarriers specifically includes: using the first subcarrier in each carrier group as an encoded subcarrier of the first subcarrier in the carrier group; using a conjugate of a previous subcarrier of the last subcarrier in each carrier group as an encoded subcarrier of the last subcarrier in the carrier group; for a subcarrier that is in a middle location and that is neither the first subcarrier nor the last subcarrier in each carrier group, subtracting a phase of a previous subcarrier of the subcarrier in the middle location from a phase of the subcarrier in the middle location, to obtain a phase of an encoded subcarrier of the subcarrier in the middle location, using an amplitude of the subcarrier in the middle location as an amplitude of the encoded subcarrier of the subcarrier in the middle location, and obtaining an encoded subcarrier of each subcarrier in a middle location in the carrier group; and obtaining encoded subcarriers of all subcarriers in each carrier group, where the encoded subcarriers of all the subcarriers in each carrier group include:

the encoded subcarrier of the first subcarrier in the carrier group, the encoded subcarrier of each subcarrier in the middle location in the carrier group, and the encoded subcarrier of the last subcarrier in the carrier group.

Figure 7:
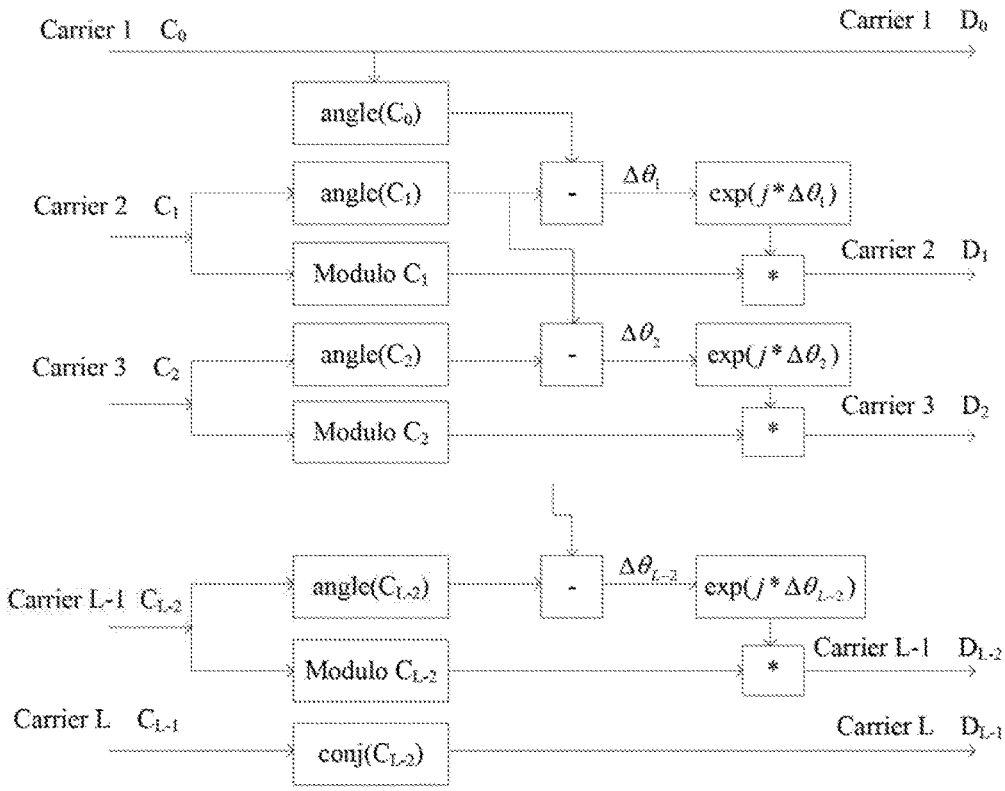
FIG. 7 is a schematic diagram of a DSP architecture of differential encoding of a carrier group in a transmitter.

FIG. 7 is a schematic diagram of a DSP architecture of differential encoding of a carrier group in a transmitter. A digital signal processing (Digital Signal Processing, DSP for short) architecture that is in the grouping and encoding module 12 and that is used for differential encoding of a carrier group may be shown in FIG. 7.

Further, the transmission module 14 specifically includes a frequency-to-time conversion unit 141, a digital-to-analog conversion unit 142, and a modulation unit 143. The frequency-to-time conversion unit 141 is configured to perform Inverse Fast Fourier Transform IFFT processing on the to-be-transmitted signal, to obtain a time-domain signal. The digital-to-analog conversion unit 142 is configured to perform digital-to-analog conversion processing on the time-domain signal, to obtain an analog signal. The modulation unit 143 is configured to modulate the analog signal to an optical carrier, and send the modulated signal to the receiver by using the non-linear optical channel.

The basic digital signal processing module 11 specifically includes a serial-to-parallel conversion unit 111 and a constellation mapping unit 112. The serial-to-parallel conversion unit 111 is configured to perform serial-to-parallel conversion processing on the input data, to obtain parallel input data. The constellation mapping unit 112 is configured to: perform constellation mapping processing on the parallel input data to obtain multiple amplitudes and phases corresponding to the amplitudes, and separately modulate the amplitudes and the phases to the continuous subcarriers in the frequency domains to generate the modulated signal.

The apparatus in this embodiment may be configured to execute the technical solution in the method embodiment shown in FIG. 1. An implementation principle and a technical effect of the apparatus are similar to those of the method embodiment. Details are not described herein.

Figure 8:
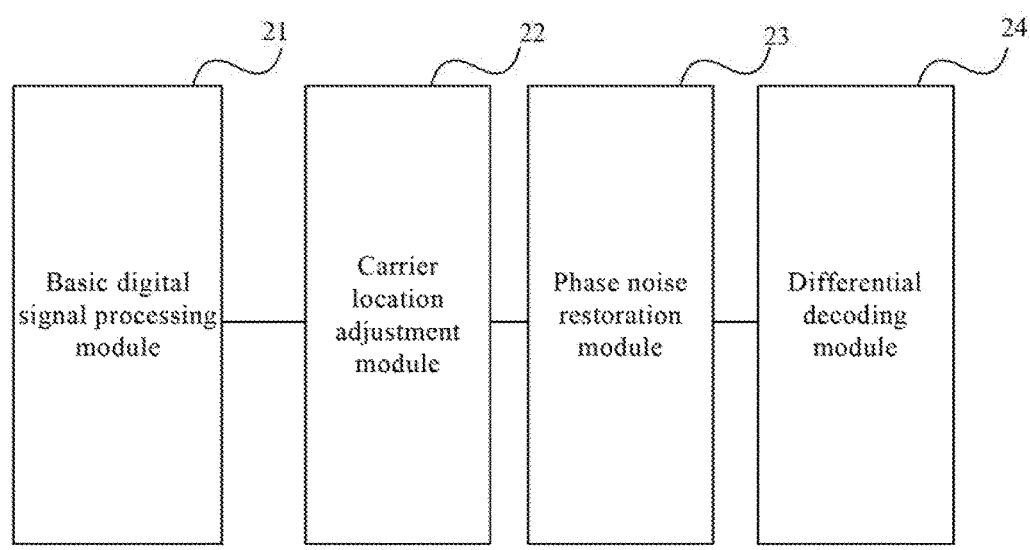
FIG. 8 is a schematic structural diagram of a first embodiment of a receiver according to the present invention.

FIG. 8 is a schematic structural diagram of a first embodiment of a receiver according to the present invention. As shown in FIG. 8, the apparatus in this embodiment may include a basic digital signal processing module 21, a carrier location adjustment module 22, a phase noise restoration module 23, and a differential decoding module 24. The basic digital signal processing module 21 is configured to perform basic digital signal processing on a received signal to obtain a first to-be-processed signal, where the first to-be-processed signal includes multiple encoded subcarriers. The carrier location adjustment module 22 is configured to sequentially adjust, starting from the center frequency, locations of two encoded subcarriers whose locations are symmetric on a positive frequency side and a negative frequency side to be continuously distributed, to obtain a second to-be-processed signal. The phase noise restoration module 23 is configured to separately obtain, according to grouping information of the encoded subcarriers in the second to-be-processed signal, a phase noise corresponding to the grouping information, and separately compensate the phase noise for the encoded subcarriers in a carrier group corresponding to the grouping information, to obtain a third to-be-processed signal. The differential decoding module 24 is configured to perform differential decoding processing on the third to-be-processed signal to obtain a processed signal.

Further, that the phase noise restoration module 23 is configured to separately obtain, according to grouping information of the encoded subcarriers in the second to-be-processed signal, a phase noise corresponding to the grouping information specifically includes: obtaining, according to the grouping information of the encoded subcarriers in the second to-be-processed signal, the carrier group corresponding to the grouping information; and separately adding up phases of the encoded subcarriers in the carrier group corresponding to the grouping information, to obtain the phase noise corresponding to the grouping information.

Figure 9:
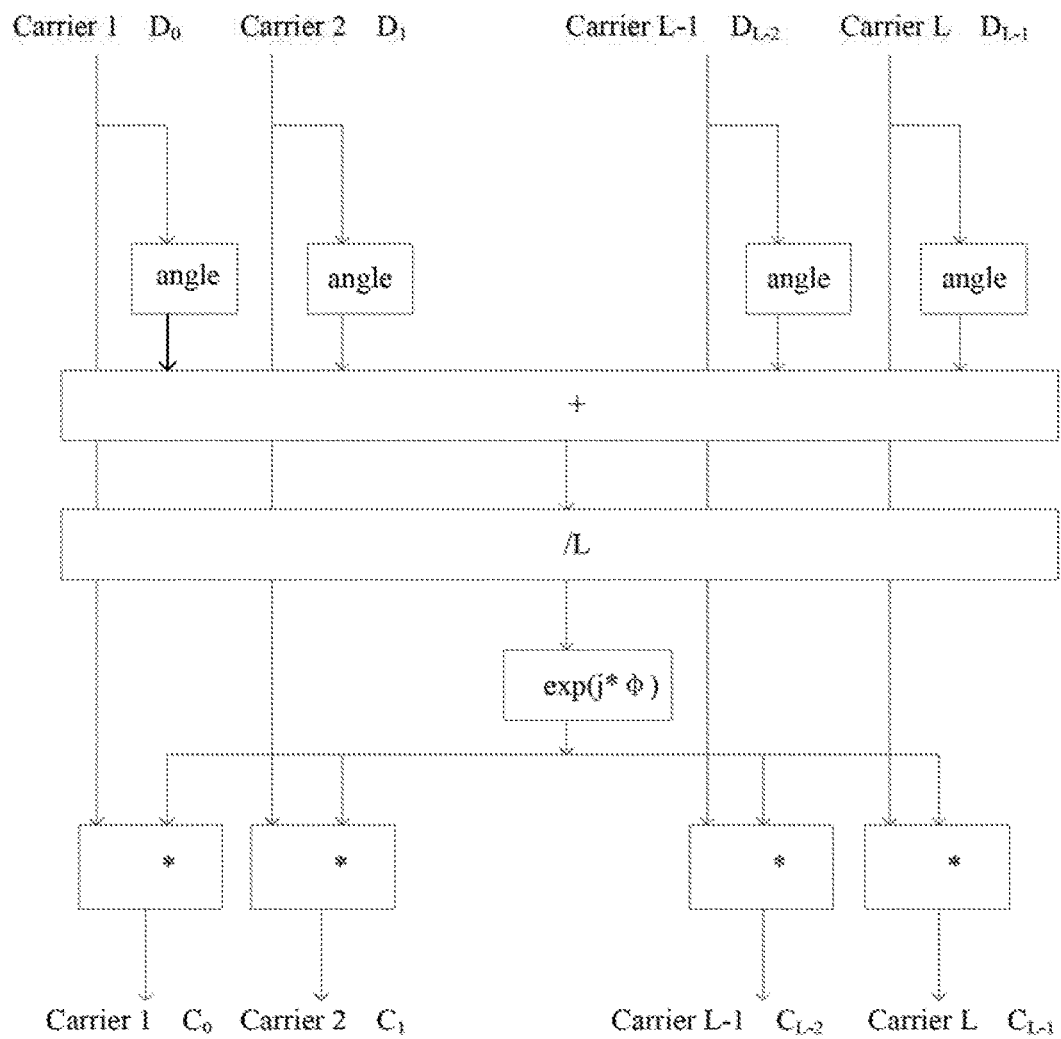
FIG. 9 is a schematic diagram of a DSP architecture of phase noise restoration of a carrier group in a receiver.

FIG. 9 is a schematic diagram of a DSP architecture of phase noise restoration of a carrier group in a receiver. Specifically, a DSP architecture that is in the phase noise restoration module 23 and that is used for phase noise restoration of a carrier group is shown in FIG. 9, where $\phi = \varphi_{NL} + \varphi_L$.

Further, that the differential decoding module 24 is configured to perform differential decoding processing on the third to-be-processed signal to obtain a processed signal specifically includes: separately using, as the first decoded subcarrier of the carrier group, the first encoded subcarrier that is in the carrier group corresponding to the grouping information and that is in the third to-be-processed signal; separately using, as the last decoded subcarrier of the carrier group, a conjugate of a previous encoded subcarrier of the last encoded subcarrier that is in the carrier group corresponding to the grouping information and that is in the third to-be-processed signal; and for an encoded subcarrier that is in a middle location in the carrier group corresponding to the grouping information, that is neither the first encoded subcarrier nor the last encoded subcarrier in the carrier group corresponding to the grouping information, and that is in the third to-be-processed signal, adding up a phase of a previous encoded subcarrier of the encoded subcarrier in the middle location and a phase of the encoded subcarrier in the middle location to obtain a phase of a decoded subcarrier in the middle location, using an amplitude of the encoded subcarrier in the middle location as an amplitude of the decoded subcarrier in the middle location, and obtaining the decoded subcarrier in the middle location in the carrier group, where the processed signal includes: the first subcarrier, each subcarrier in a middle location, and the last subcarrier that are obtained after decoding and that are in the carrier group corresponding to the grouping information.

The apparatus in this embodiment may be configured to execute the technical solution in the method embodiment shown in FIG. 5. An implementation principle and a technical effect of the apparatus are similar to those of the method embodiment. Details are not described herein.

Figure 10:
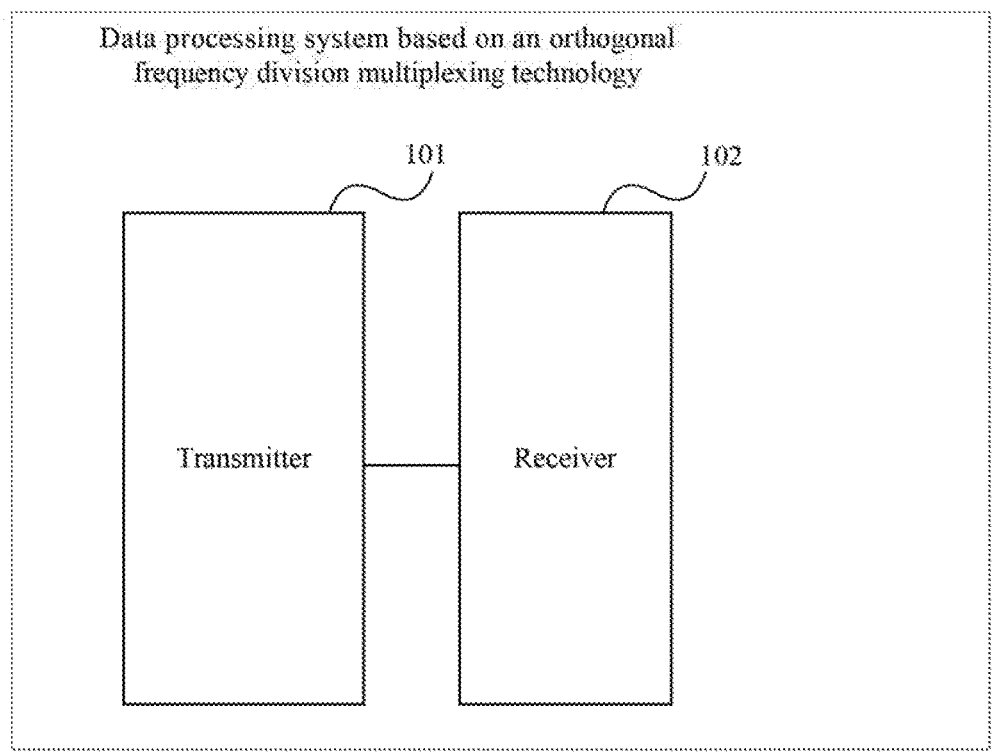
FIG. 10 is a schematic structural diagram of an embodiment of a data processing system based on an orthogonal frequency division multiplexing technology according to the present invention.

FIG. 10 is a schematic structural diagram of an embodiment of a data processing system based on an orthogonal frequency division multiplexing technology according to the present invention. As shown in FIG. 10, the system in this embodiment includes a transmitter 101 and a receiver 102. The structure in any apparatus embodiment of FIG. 6, FIG. 8, or FIG. 9 may be used for the transmitter 101. Correspondingly, the transmitter 101 may execute the technical solution in the method embodiment of FIG. 1. An implementation principle and a technical effect of the transmitter 101 are similar to those of the method embodiment. Details are not described herein. The structure in the apparatus embodiment of FIG. 10 or FIG. 11 may be used for the receiver 102. Correspondingly, the receiver 102 may execute the technical solution in the method embodiment of FIG. 5. An implementation principle and a technical effect of the receiver 102 are similar to those of the method embodiment. Details are not described herein.

Figure 11:
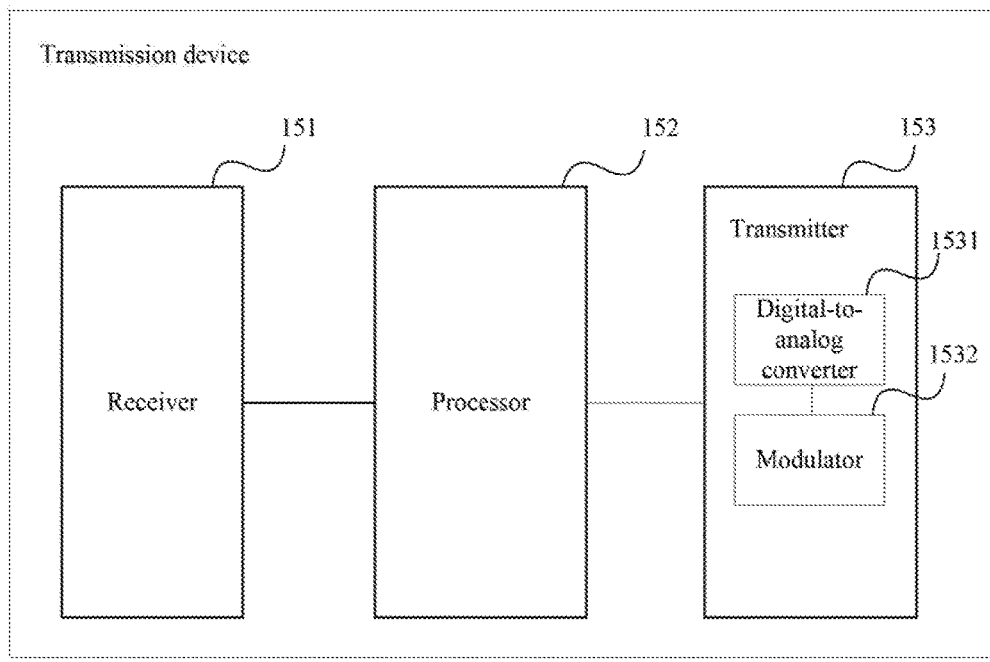
FIG. 11 is a schematic structural diagram of a transmission device according to the present invention.

FIG. 11 is a schematic structural diagram of a transmission device according to the present invention. As shown in FIG. 11, the transmission device in this embodiment may include a receiver 151, a processor 152, and a transmitter 153. The receiver 151 is configured to receive input data. The processor 152 is configured to: process the input data to obtain a modulated signal, where the modulated signal includes continuous subcarriers in multiple frequency domains; group the continuous subcarriers in the multiple frequency domains according to grouping information, to obtain multiple carrier groups, where each carrier group includes at least one of the subcarriers, the grouping information is related to a correspondence between a non-linear noise and a frequency, and a difference between non-linear noises corresponding to subcarriers in each carrier group is in a threshold range; separately perform differential phase encoding on the subcarriers in each carrier group, to obtain encoded subcarriers of the subcarriers; adjust, according to a sequence, the encoded subcarriers of the continuous subcarriers to frequency locations that are symmetric on a positive frequency side and a negative frequency side, to obtain a to-be-transmitted signal; and perform frequency-to-time conversion processing on the to-be-transmitted signal, to obtain a time-domain signal. The transmitter 153 is configured to send the time-domain signal to a receiving device by using a non-linear optical channel.

Further, that the processor 152 is configured to separately perform differential phase encoding on the subcarriers in each carrier group, to obtain encoded subcarriers of the subcarriers specifically includes: using the first subcarrier in each carrier group as an encoded subcarrier of the first subcarrier in the carrier group; using a conjugate of a previous subcarrier of the last subcarrier in each carrier group as an encoded subcarrier of the last subcarrier in the carrier group; for a subcarrier that is in a middle location and that is neither the first subcarrier nor the last subcarrier in each carrier group, subtracting a phase of a previous subcarrier of the subcarrier in the middle location from a phase of the subcarrier in the middle location, to obtain a phase of an encoded subcarrier of the subcarrier in the middle location, using an amplitude of the subcarrier in the middle location as an amplitude of the encoded subcarrier of the subcarrier in the middle location, and obtaining an encoded subcarrier of each subcarrier in a middle location in the carrier group; and obtaining encoded subcarriers of all subcarriers in each carrier group, where the encoded subcarriers of all the subcarriers in each carrier group include: the encoded subcarrier of the first subcarrier in the carrier group, the encoded subcarrier of each subcarrier in the middle location in the carrier group, and the encoded subcarrier of the last subcarrier in the carrier group.

Further, the transmitter 153 specifically includes a digital-to-analog converter 1531 and a modulator 1532.

The digital-to-analog converter 1531 is configured to perform digital-to-analog conversion processing on the time-domain signal, to obtain an analog signal.

The modulator 1532 is configured to modulate the analog signal to an optical carrier, and send the modulated signal to the receiver by using the non-linear optical channel.

Further, that the processor 152 is configured to process the input data to obtain a modulated signal, where the modulated signal includes continuous subcarriers in multiple frequency domains specifically includes: performing serial-to-parallel conversion processing on the input data, to obtain parallel input data; and performing constellation mapping processing on the parallel input data to obtain multiple amplitudes and phases corresponding to the amplitudes, and separately modulating the amplitudes and the phases to the continuous subcarriers in the frequency domains to generate the modulated signal.

The apparatus in this embodiment may be configured to execute the technical solution in the method embodiment shown in FIG. 1. An implementation principle and a technical effect of the apparatus are similar to those of the method embodiment. Details are not described herein.

Figure 12:
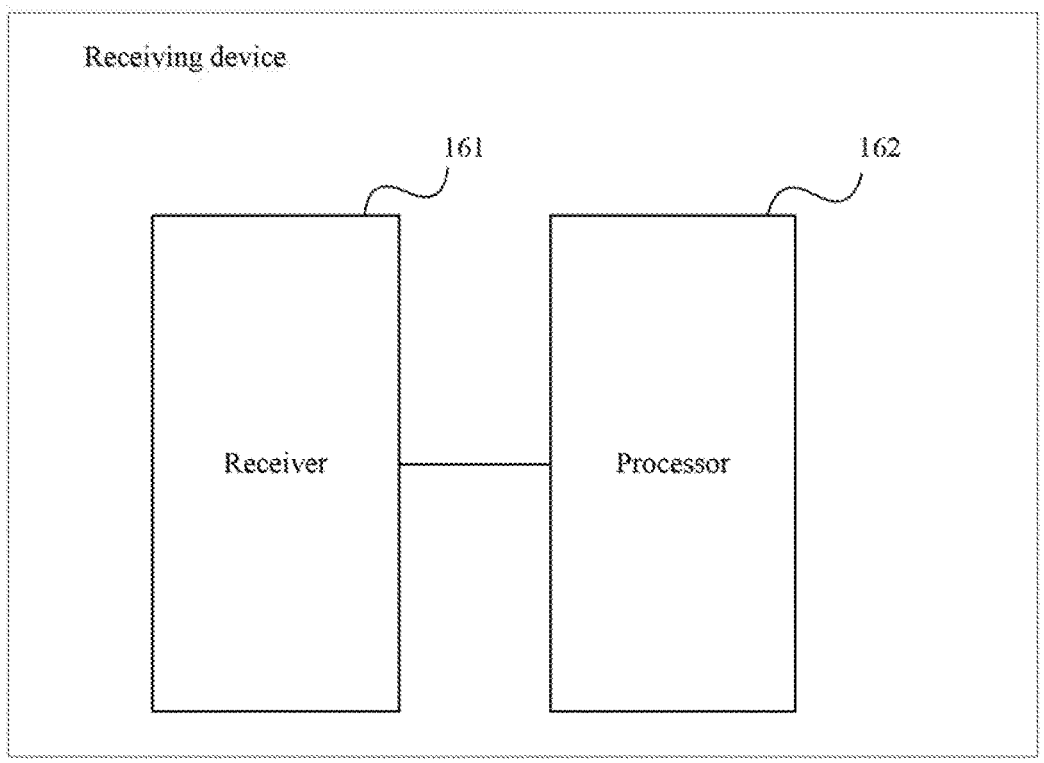
FIG. 12 is a schematic structural diagram of a receiving device according to the present invention.

FIG. 12 is a schematic structural diagram of a receiving device according to the present invention. As shown in FIG. 12, the receiving device in this embodiment may include a receiver 161 and a processor 162. The receiver 161 is configured to receive a signal sent by a transmission device. The processor 162 is configured to: perform basic digital signal processing on the signal to obtain a first to-be-processed signal, where the first to-be-processed signal includes multiple encoded subcarriers; sequentially adjust, starting from the center frequency, locations of two encoded subcarriers whose locations are symmetric on a positive frequency side and a negative frequency side to be continuously distributed, to obtain a second to-be-processed signal; separately obtain, according to grouping information of the encoded subcarriers in the second to-be-processed signal, a phase noise corresponding to the grouping information, and separately compensate the phase noise for the encoded subcarriers in a carrier group corresponding to the grouping information, to obtain a third to-be-processed signal; and perform differential decoding processing on the third to-be-processed signal to obtain a processed signal.

Further, that the processor 162 is configured to separately obtain, according to grouping information of the encoded subcarriers in the second to-be-processed signal, a phase noise corresponding to the grouping information specifically includes: obtaining, according to the grouping information of the encoded subcarriers in the second to-be-processed signal, the carrier group corresponding to the grouping information; and separately adding up phases of the encoded subcarriers in the carrier group corresponding to the grouping information, to obtain the phase noise corresponding to the grouping information.

Further, that the processor 162 is configured to perform differential decoding processing on the third to-be-processed signal to obtain a processed signal specifically includes: separately using, as the first decoded subcarrier of the carrier group, the first encoded subcarrier that is in the carrier group corresponding to the grouping information and that is in the third to-be-processed signal; separately using, as the last decoded subcarrier of the carrier group, a conjugate of a previous encoded subcarrier of the last encoded subcarrier that is in the carrier group corresponding to the grouping information and that is in the third to-be-processed signal; and for an encoded subcarrier that is in a middle location in the carrier group corresponding to the grouping information, that is neither the first encoded subcarrier nor the last encoded subcarrier in the carrier group corresponding to the grouping information, and that is in the third to-be-processed signal, adding up a phase of a previous encoded subcarrier of the encoded subcarrier in the middle location and a phase of the encoded subcarrier in the middle location to obtain a phase of a decoded subcarrier in the middle location, using an amplitude of the encoded subcarrier in the middle location as an amplitude of the decoded subcarrier in the middle location, and obtaining the decoded subcarrier in the middle location in the carrier group, where the processed signal includes: the first subcarrier, each subcarrier in a middle location, and the last subcarrier that are obtained after decoding and that are in the carrier group corresponding to the grouping information.

The apparatus in this embodiment may be configured to execute the technical solution in the method embodiment shown in FIG. 5. An implementation principle and a technical effect of the apparatus are similar to those of the method embodiment. Details are not described herein.

In the several embodiments provided in the present invention, it should be understood that the disclosed apparatus and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (processor) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method based on an orthogonal frequency division multiplexing technology, comprising:
   processing input data to obtain a modulated signal, wherein the modulated signal comprises continuous subcarriers in multiple frequency domains;
   grouping the continuous subcarriers in the multiple frequency domains according to grouping information, to obtain multiple carrier groups, wherein each carrier group comprises at least one of the subcarriers, the grouping information is related to a correspondence between a non-linear noise and a frequency, and a difference between non-linear noises corresponding to subcarriers in each carrier group is in a threshold range;
   separately performing differential phase encoding on the subcarriers in each carrier group, to obtain encoded subcarriers of the subcarriers;
   adjusting, according to a sequence, the encoded subcarriers of the continuous subcarriers to frequency locations that are symmetric on a positive frequency side and a negative frequency side, to obtain a to-be-transmitted signal, and
   performing frequency-to-time conversion processing on the to-be-transmitted signal, and sending a signal to a receiver by using a non-linear optical channel.

2. The method according to claim 1, wherein the separately performing differential phase encoding on the subcarriers in each carrier group, to obtain encoded subcarriers of the subcarriers comprises:
   using the first subcarrier in each carrier group as an encoded subcarrier of the first subcarrier in the carrier group;
   using a conjugate of a previous subcarrier of the last subcarrier in each carrier group as an encoded subcarrier of the last subcarrier in the carrier group;
   for a subcarrier that is in a middle location and that is neither the first subcarrier nor the last subcarrier in each carrier group, subtracting a phase of a previous subcarrier of the subcarrier in the middle location from a phase of the subcarrier in the middle location, to obtain a phase of an encoded subcarrier of the subcarrier in the middle location, using an amplitude of the subcarrier in the middle location as an amplitude of the encoded subcarrier of the subcarrier in the middle location, and obtaining an encoded subcarrier of each subcarrier in a middle location in the carrier group; and
   obtaining encoded subcarriers of all subcarriers in each carrier group, wherein the encoded subcarriers of all the subcarriers in each carrier group comprise: the encoded subcarrier of the first subcarrier in the carrier group, the encoded subcarrier of each subcarrier in the middle location in the carrier group, and the encoded subcarrier of the last subcarrier in the carrier group.

3. The method according to claim 1, wherein the performing frequency-to-time conversion processing on the to-be-transmitted signal, and sending a signal to a receiver by using a non-linear optical channel comprises:
   performing Inverse Fast Fourier Transform IFFT processing on the to-be-transmitted signal to obtain a time-domain signal, performing digital-to-analog conversion processing on the time-domain signal to obtain an analog signal, modulating the analog signal to an optical carrier, and sending the modulated signal to the receiver by using the non-linear optical channel.

4. The method according to claim 1, wherein the processing input data to obtain a modulated signal, wherein the modulated signal comprises continuous subcarriers in multiple frequency domains comprises:
  performing serial-to-parallel conversion processing on the input data, to obtain parallel input data; and
  performing constellation mapping processing on the parallel input data to obtain multiple amplitudes and phases corresponding to the amplitudes, and separately modulating the amplitudes and the phases to the continuous subcarriers in the frequency domains to generate the modulated signal.

5. A data receiving method based on an orthogonal frequency division multiplexing technology, comprising:
  performing basic digital signal processing on a received signal to obtain a first to-be-processed signal, wherein the first to-be-processed signal comprises multiple encoded subcarriers;
  sequentially adjusting, starting from a center frequency, locations of two encoded subcarriers whose locations are symmetric on a positive frequency side and a negative frequency side to be continuously distributed, to obtain a second to-be-processed signal;
  separately obtaining, according to grouping information of the encoded subcarriers in the second to-be-processed signal, a phase noise corresponding to the grouping information, and separately compensating the phase noise for the encoded subcarriers in a carrier group corresponding to the grouping information, to obtain a third to-be-processed signal; and
  performing differential decoding processing on the third to-be-processed signal to obtain a processed signal.

6. The method according to claim 5, wherein the separately obtaining, according to grouping information of the encoded subcarriers in the second to-be-processed signal, a phase noise corresponding to the grouping information comprises:
  obtaining, according to the grouping information of the encoded subcarriers in the second to-be-processed signal, the carrier group corresponding to the grouping information; and
  separately adding up phases of the encoded subcarriers in the carrier group corresponding to the grouping information, to obtain the phase noise corresponding to the grouping information.

7. The method according to claim 5, wherein the performing differential decoding processing on the third to-be-processed signal to obtain a processed signal comprises:
  separately using, as the first decoded subcarrier of the carrier group, the first encoded subcarrier that is in the carrier group corresponding to the grouping information and that is in the third to-be-processed signal;
  separately using, as the last decoded subcarrier of the carrier group, a conjugate of a previous encoded subcarrier of the last encoded subcarrier that is in the carrier group corresponding to the grouping information and that is in the third to-be-processed signal, and
  for an encoded subcarrier that is in a middle location in the carrier group corresponding to the grouping information, that is neither the first encoded subcarrier nor the last encoded subcarrier in the carrier group corresponding to the grouping information, and that is in the third to-be-processed signal, adding up a phase of a previous encoded subcarrier of the encoded subcarrier in the middle location and a phase of the encoded subcarrier in the middle location to obtain a phase of a decoded subcarrier in the middle location, using an amplitude of the encoded subcarrier in the middle location as an amplitude of the decoded subcarrier in the middle location, and obtaining the decoded subcarrier in the middle location in the carrier group, wherein the processed signal comprises: the first subcarrier, each subcarrier in a middle location, and the last subcarrier that are obtained after decoding and that are in the carrier group corresponding to the grouping information.

8. A transmission device, comprising:
  a receiver, configured to receive input data;
  a processor, configured to: process the input data to obtain a modulated signal, wherein the modulated signal comprises continuous subcarriers in multiple frequency domains; group the continuous subcarriers in the multiple frequency domains according to grouping information, to obtain multiple carrier groups, wherein each carrier group comprises at least one of the subcarriers, the grouping information is related to a correspondence between a non-linear noise and a frequency, and a difference between non-linear noises corresponding to subcarriers in each carrier group is in a threshold range; separately perform differential phase encoding on the subcarriers in each carrier group, to obtain encoded subcarriers of the subcarriers; adjust, according to a sequence, the encoded subcarriers of the continuous subcarriers to frequency locations that are symmetric on a positive frequency side and a negative frequency side, to obtain a to-be-transmitted signal; and perform frequency-to-time conversion processing on the to-be-transmitted signal, to obtain a time-domain signal; and
  a transmitter, configured to send the time-domain signal to a receiving device by using a non-linear optical channel.

9. The transmission device according to claim 8, wherein that the processor is configured to separately perform differential phase encoding on the subcarriers in each carrier group, to obtain encoded subcarriers of the subcarriers comprises:
  using the first subcarrier in each carrier group as an encoded subcarrier of the first subcarrier in the carrier group;
  using a conjugate of a previous subcarrier of the last subcarrier in each carrier group as an encoded subcarrier of the last subcarrier in the carrier group;
  for a subcarrier that is in a middle location and that is neither the first subcarrier nor the last subcarrier in each carrier group, subtracting a phase of a previous subcarrier of the subcarrier in the middle location from a phase of the subcarrier in the middle location, to obtain a phase of an encoded subcarrier of the subcarrier in the middle location, using an amplitude of the subcarrier in the middle location as an amplitude of the encoded subcarrier of the subcarrier in the middle location, and obtaining an encoded subcarrier of each subcarrier in a middle location in the carrier group; and
  obtaining encoded subcarriers of all subcarriers in each carrier group, wherein the encoded subcarriers of all the subcarriers in each carrier group comprise: the encoded subcarrier of the first subcarrier in the carrier group, the encoded subcarrier of each subcarrier in the middle location in the carrier group, and the encoded subcarrier of the last subcarrier in the carrier group.

10. The transmission device according to claim 8, wherein the transmitter comprises a digital-to-analog converter and a modulator, wherein the digital-to-analog converter is configured to perform digital-to-analog conversion processing on the time-domain signal, to obtain an analog signal; and the modulator is configured to modulate the analog signal to an optical carrier, and send the modulated signal to the receiver by using the non-linear optical channel.

11. The transmission device according to claim 8, wherein that the processor is configured to process the input data to obtain a modulated signal, wherein the modulated signal comprises continuous subcarriers in multiple frequency domains comprises:

performing serial-to-parallel conversion processing on the input data, to obtain parallel input data; and performing constellation mapping processing on the parallel input data to obtain multiple amplitudes and phases corresponding to the amplitudes, and separately modulating the amplitudes and the phases to the continuous subcarriers in the frequency domains to generate the modulated signal.

12. A receiving device, wherein the receiving device comprises:

a receiver, configured to receive a signal sent by a transmission device; and a processor, configured to: perform basic digital signal processing on the signal to obtain a first to-be-processed signal, wherein the first to-be-processed signal comprises multiple encoded subcarriers; sequentially adjust, starting from the center frequency, locations of two encoded subcarriers whose locations are symmetric on a positive frequency side and a negative frequency side to be continuously distributed, to obtain a second to-be-processed signal; separately obtain, according to grouping information of the encoded subcarriers in the second to-be-processed signal, a phase noise corresponding to the grouping information, and separately compensate the phase noise for the encoded subcarriers in a carrier group corresponding to the grouping information, to obtain a third to-be-processed signal; and perform differential decoding processing on the third to-be-processed signal to obtain a processed signal.

13. The receiving device according to claim 12, wherein that the processor is configured to separately obtain, according to grouping information of the encoded subcarriers in the second to-be-processed signal, a phase noise corresponding to the grouping information comprises:

obtaining, according to the grouping information of the encoded subcarriers in the second to-be-processed signal, the carrier group corresponding to the grouping information; and separately adding up phases of the encoded subcarriers in the carrier group corresponding to the grouping information, to obtain the phase noise corresponding to the grouping information.

14. The receiving device according to claim 12, wherein that the processor is configured to perform differential decoding processing on the third to-be-processed signal to obtain a processed signal comprises:

separately using, as the first decoded subcarrier of the carrier group, the first encoded subcarrier that is in the carrier group corresponding to the grouping information and that is in the third to-be-processed signal;

separately using, as the last decoded subcarrier of the carrier group, a conjugate of a previous encoded subcarrier of the last encoded subcarrier that is in the carrier group corresponding to the grouping information and that is in the third to-be-processed signal, and for an encoded subcarrier that is in a middle location in the carrier group corresponding to the grouping information, that is neither the first encoded subcarrier nor the last encoded subcarrier in the carrier group corresponding to the grouping information, and that is in the third to-be-processed signal, adding up a phase of a previous encoded subcarrier of the encoded subcarrier in the middle location and a phase of the encoded subcarrier in the middle location to obtain a phase of a decoded subcarrier in the middle location, using an amplitude of the encoded subcarrier in the middle location as an amplitude of the decoded subcarrier in the middle location, and obtaining the decoded subcarrier in the middle location in the carrier group, wherein the processed signal comprises: the first subcarrier, each subcarrier in a middle location, and the last subcarrier that are obtained after decoding and that are in the carrier group corresponding to the grouping information.

\* \* \* \* \*

UNITED STATES PATENT AND TRADEMARK OFFICE
CERTIFICATE OF CORRECTION

PATENT NO. : 10,313,016 B2  
APPLICATION NO. : 15/852561  
DATED : June 4, 2019  
INVENTOR(S) : Yuanyuan Fang et al.

Page 1 of 1

It is certified that error appears in the above-identified patent and that said Letters Patent is hereby corrected as shown below:

In the Claims

Column 18, Line 25:
In Claim 1, after "to-be-transmitted" delete "signal," and insert -- signal; --, therefor.

Column 19, Line 57:
In Claim 7, after "to-be-processed" delete "signal," and insert -- signal; --, therefor.

Column 22, Line 23:
In Claim 14, after "to-be-processed" delete "signal," and insert -- signal; --, therefor.

Signed and Sealed this
Twenty-sixth Day of November, 2019

Andrei Iancu
*Director of the United States Patent and Trademark Office*